United States Patent [19]
Turman

[11] Patent Number: 5,691,510
[45] Date of Patent: Nov. 25, 1997

[54] PAN TENSION MEASURING DEVICE FOR LEGHOLD TRAPS

[75] Inventor: John W. Turman, El Cajon, Calif.

[73] Assignee: The United States of America as represented by the Secretary of Agriculture, Washington, D.C.

[21] Appl. No.: 387,071

[22] Filed: Feb. 13, 1995

[51] Int. Cl.$^6$ .............. G01G 3/00; G01G 19/00; A01M 23/00; A01M 23/26
[52] U.S. Cl. .............. 177/225; 177/233; 177/245; 43/58; 43/88
[58] Field of Search .................. 177/233, 232, 177/231, 245, 225, 212; 43/58, 88, 96, 97; 73/862.451, 862.471, 862.541, 862.637

[56] References Cited

U.S. PATENT DOCUMENTS

| | | | |
|---|---|---|---|
| 3,977,094 | 8/1976 | Rivera et al. | 36/7.8 |
| 4,152,018 | 5/1979 | Cantrell | 292/305 |
| 4,399,685 | 8/1983 | Atkey | 73/11 |
| 4,557,068 | 12/1985 | Thomas et al. | 43/90 |
| 5,443,435 | 8/1995 | Wilkinson | 482/74 |

*Primary Examiner*—Michael L. Gellner
*Assistant Examiner*—Michael J. Hayes
*Attorney, Agent, or Firm*—Ancel W. Lewis, Jr.

[57] ABSTRACT

A tension scale device particularly suitable for measuring pan tension on a leghold trap. The device comprises a housing with a slot and an open front end, a compression member preferably a spring in the housing, and a movable member having a rear portion that telescopes in the housing and a front portion that extends beyond the front end of the housing. The spring is compressed by moving the movable member into the housing. A scale is provided on the movable member together with a slidable indicator. When the front end of the movable member is pressed onto a trap pan or like tension member being measured, the scale indicates the amount of weight or tension being applied to a tension device.

2 Claims, 2 Drawing Sheets

PAN TENSION MEASURING DEVICE FOR LEGHOLD TRAPS

TECHNICAL FIELD

This invention generally relates to measuring scales and more particularly to a tension scale device that is especially suitable, for measuring pan tension on a steel or padded jaw leghold trap.

BACKGROUND ART

In the capture of wild animals, primarily coyotes, by the USDA-APHIS animal damage control and the private sector steel or padded jaw leghold traps are used. This trap is most effective and the selective method used to capture coyotes when used properly. Proper use includes the use of an adjustable tension device on the trap required by law in some states. A properly adjusted tension device will require frequent checking to insure setting of the correct pan tension.

Pan tension is the amount of weight applied to the trap pan of a steel or padded jaw leghold trap sufficient to activate the trap. The correct pan tension is very critical in excluding smaller, lighter, non-targeted animals from these traps. This weight can be adjusted on traps equipped with a pan tension device.

DISCLOSURE OF THE INVENTION

In accordance with the present invention there is provided a tension scale device having a housing closed at one end and open at the other end and having an elongated slot extending along the housing. A compression spring is disposed in the housing. A movable member has a rear portion telescoped in the housing and a front portion extending beyond the end of the housing that is resiliently urged to an extended position under the force of the spring, the movable member being movable between the extended and a range of retracted positions. A fastening member secures the movable member to the housing in the extended position. A scale calibrated in pounds is provided on the housing and an indicator slides along the movable member to indicate the amount of tension applied to force the movable member into the housing thereby measuring the amount of tension or weight applied to a tension device such as a trap pan necessary to activate the trap.

BRIEF DESCRIPTION OF THE DRAWINGS

Details of this invention are described in connection with the accompanying drawings which like parts bear similar reference numerals in which.

DETAILED DESCRIPTION

Figures 1, 3:
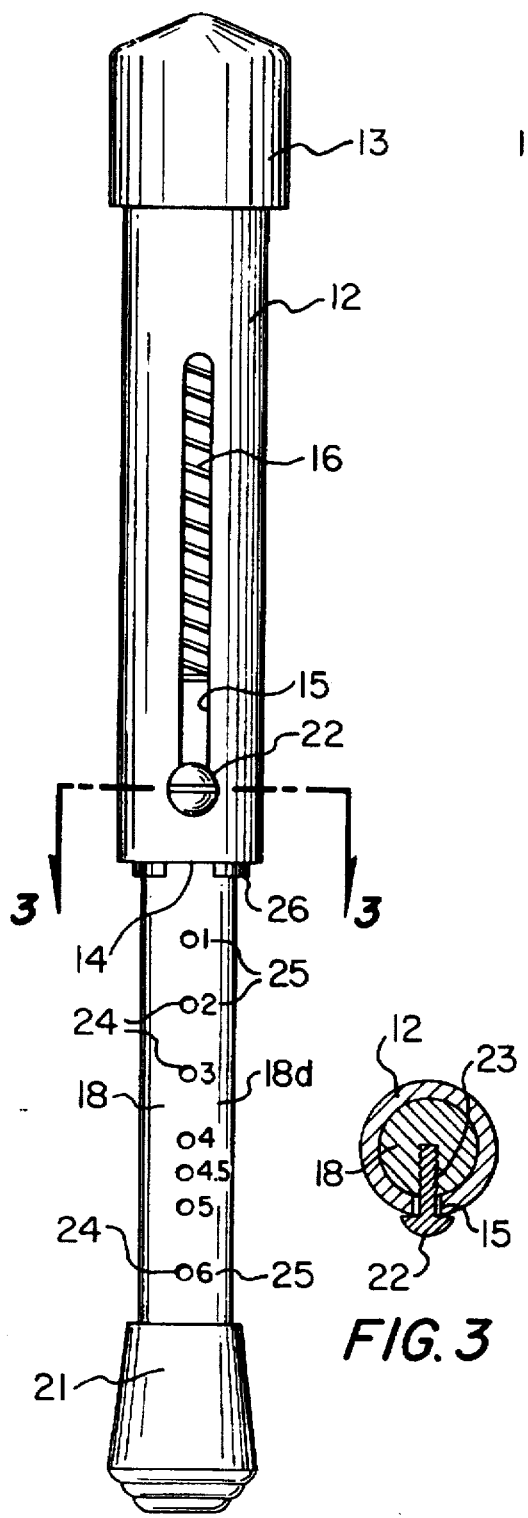
FIG. 1 is a front elevation view of a tension scale device embodying features of the present invention with the movable member in a fully extended position.
FIG. 3 is a sectional view taken along line 3—3 of FIG. 1.
Figure 2:
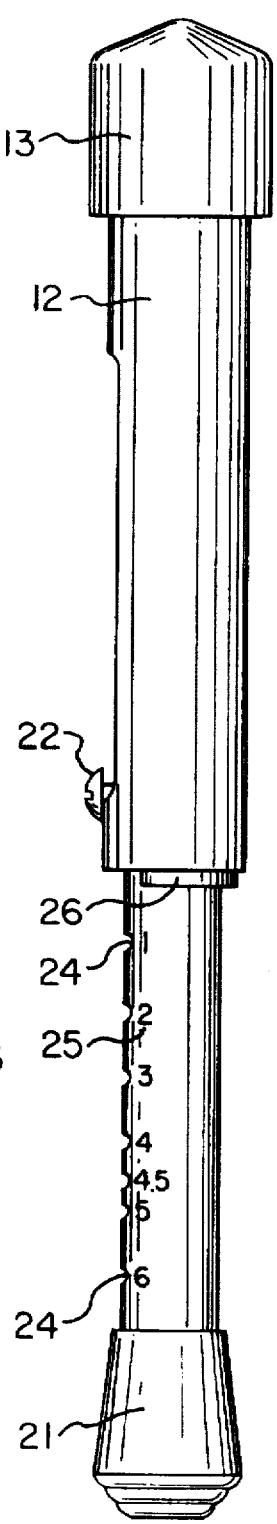
FIG. 2 is a side elevation view of the tension scale device shown in FIG. 1.

In describing the specific embodiment herein chosen for illustrating the invention certain terminology is used for convenience which will be recognized as employed only for convenience and having no limiting significance. For example, the terms "front" and "rear" will refer to the directions toward and away from a location occupied by the operator during normal operation of the device, namely toward and away from the tension device for which tension is being measured.

Referring now to FIGS. 1–5 there is shown a portable tension scale device embodying features of the present invention which includes a housing 12 made from an open ended PVC tube having a rubber or plastic end cap 13 preferably PVC that fits over and closes the rear end of the tube to provide an open front end 14. The housing 12 is of circular cross section and has an elongated slot 15 extending a substantial distance along the housing 12. A compression spring 16 is telescoped in the housing with the end cap 13 providing a stop for the rear end 16a of the spring 16.

A movable member 18 in the form of a rod or shaft of circular cross section and preferably solid and made of PVC telescopes in the housing and a rear end 18a bears against the front end 16b of the spring 16. In the extended position a rear portion 18c telescopes in the housing and a front portion 18d is forced out of and extends beyond the open front end 14 of the housing by the spring 16. A fastening member 22 shown in the form of a screw with external threads extends through the slot and threads into an internally threaded hole 23 in the movable member 18 to fasten the movable member 18 to the housing and allow slidable telescoping movement of the movable member in the housing. Fastening member 22 bears against the outer end 15a of the slot 15 to prevent the movable member from being forced out of the end of the housing.

A scale in the form of a series of spaced marks in the form of circular depressions or dimples 24 are provided in movable member 18. The distance of each of the depressions 24 along the movable member 18 are calibrated to indicate the amounts of weight or tension in pounds. There are seven depressions shown and beginning at the rear end and progressing toward the front end are numbered with indicia generally designated by numeral 25 by numerals 1, 2, 3, 4, 4 1/2, 5 and 6 pounds tension. An indicator 26 in the form of a split ring fits around and grips the movable member 18. This split ring 26 is slidable on the movable member 18 and moves against the open front end 14 of the housing to indicate the amount of force or tension applied to force the movable member 18 into the housing thereby providing a measure of the weight or tension. The split ring 26 extends substantially beyond an arc of 180 degrees such as about 270 degrees. A rubber or plastic end cap 21, preferably rubber, is mounted on the front end 18b of the movable member 18 to press against or engage any tension device for which tension is being measured.

Figure 4:
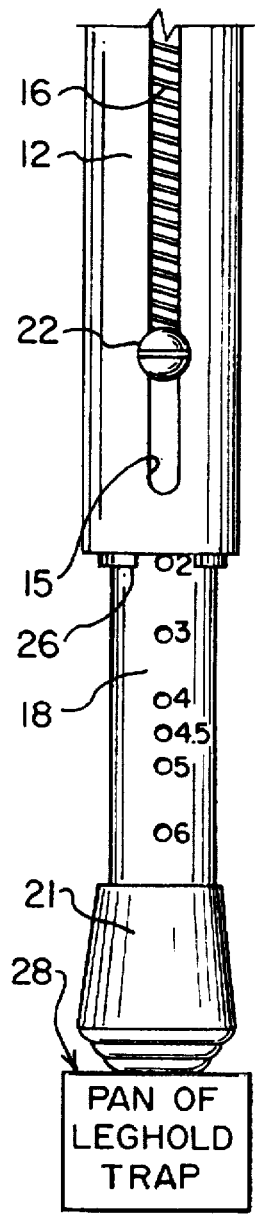
FIG. 4 is a front elevation view of the tension scale device in a measuring condition with the movable member in partially retracted position.
Figure 5:
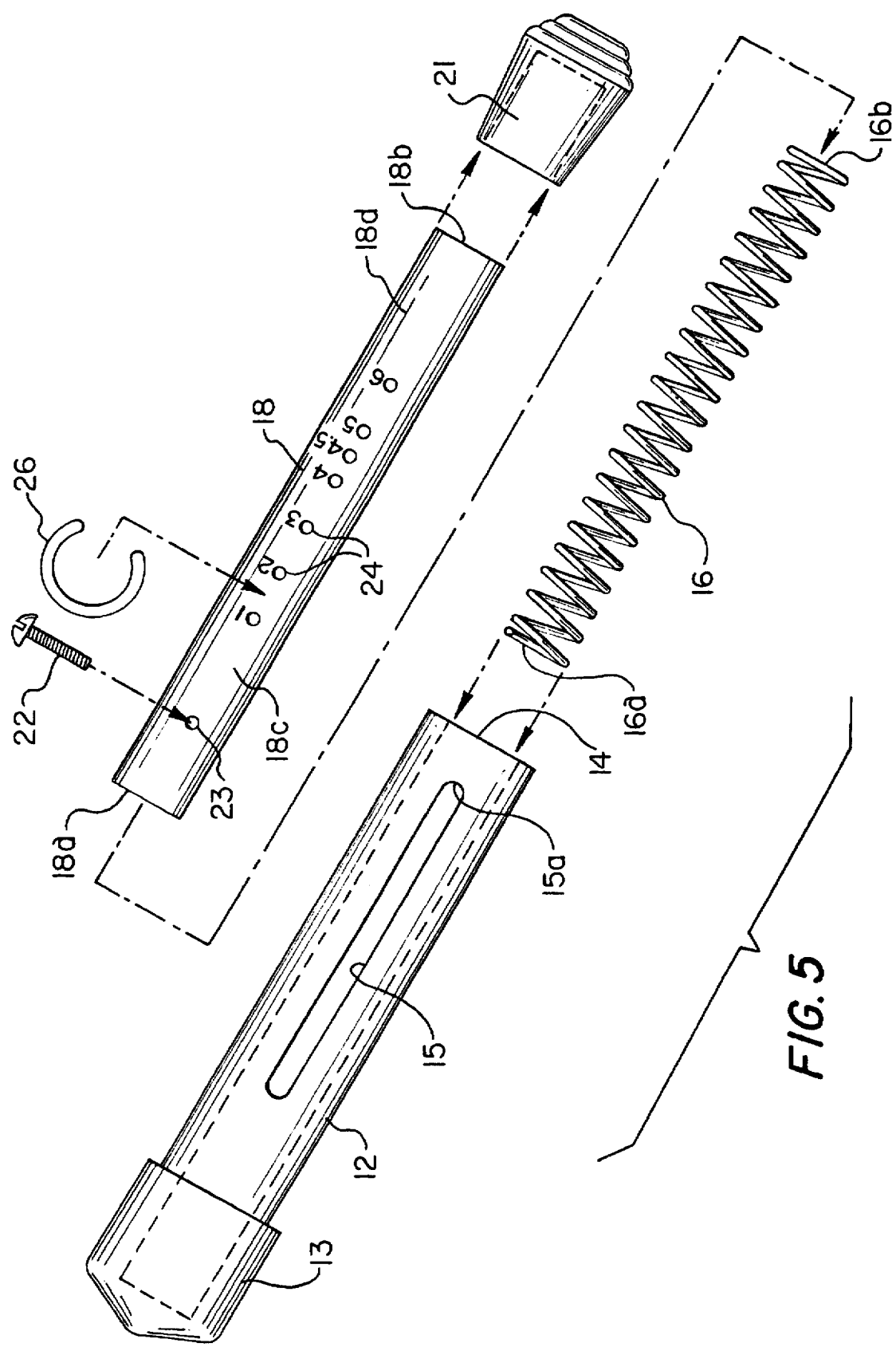
FIG. 5 is a front elevation view of the tension scale device shown in FIGS. 1–4 with the parts shown disassembled.

In use, the user grips the housing 12 and the front end cap 21 on the front end of movable member 18 is pressed against, for example, a trap pan 28 or any other tension device for which the tension is being measured as is shown in FIG. 4. The movable member 18 retracts into the housing 12 against compression forces of the spring to measure the amount of pounds on the scale. The split ring 26 bears against the open front end 14 of the housing and slides along the movable member 18. When the front end cap and movable member are removed from pressing against the trap pan 28 the spring 16 will push the movable member back to the fully extended position and the amount of weight is indicated by the position of the split ring 26 on the movable member 18 in relation to the scale depressions 24. A measurement of two pounds is shown in FIG. 4.

Although the present invention has been described with a certain degree of particularity, it is understood that the present disclosure has been made by way of example and that changes in details of structure may be made without departing from the spirit thereof.

What is claimed is:

1. The combination of a trap pan tension scale device and an adjustable tension trap pan device on a trap comprising:

a trap pan device including an adjustable tension trap pan, and a tension scale device including a housing with an elongated slot extending along the housing, said housing having an open front end, a compression means in the housing, a movable member having a rear portion telescoping in said housing and a front portion extending beyond said open end, said movable member having an outer end that is urged against said adjustable tension trap pan to move said movable member further into said housing against the compression forces of said compression means with amount of tension being related to the amount of force to move the movable member a selected distance into the housing, a fastening member extending through the housing slot and into said movable member to hold the movable member in the housing, a scale in the form of a series of spaced marks on said movable member calibrated in relation to distance along said movable member to indicate tension, and an indicator slidable on the movable member that is moved against said open end of the housing when said movable member moves into said housing whereby to indicate on said scale the tension on said adjustable tension trap pan.

2. A portable tension scale device for measuring pan tension of a pan on a leghold trap comprising:

a housing with an elongated slot extending along the housing, said housing having an open front end, a compression spring in said housing, a movable solid shaft having a rear portion telescoping in said housing and a front portion extending beyond said open end, said shaft having a front end that is urged against said pan on said leghold trap to move said shaft further into said housing against the compression forces of said spring with amount of tension being related to the amount of force to move said shaft a selected distance into the housing, an externally threaded screw extending through the housing slot and threading into said movable shaft to hold said shaft in the housing, a scale in the form of a series of spaced marks on said shaft calibrated in relation to distance along said shaft to indicate tension, and a split ring gripping and slidable on said shaft that is moved against said open front end of said housing when said shaft moves into said housing whereby to indicate on said scale the pan tension of said pan on said leghold trap.

* * * * *